United States Patent [19]

Simon et al.

[11] Patent Number: 5,722,269
[45] Date of Patent: Mar. 3, 1998

[54] LOCKING DEVICE FOR CABINET OR CUPBOARD DOORS

[75] Inventors: Peter Simon, München; Hans Flamme, Unterhaching; Robert Streifeneder, Pilsting; Dieter Ramsauer, Braunschweig, all of Germany

[73] Assignees: Knürr-Mechanik für die Elektronik Aktiengesellschaft, München; DIRAK Dieter Ramsauer Konstruktionselemente GmbH & Co., KG, Schwelm, both of Germany

[21] Appl. No.: 432,133

[22] PCT Filed: Dec. 22, 1993

[86] PCT No.: PCT/EP93/03667

§ 371 Date: Oct. 11, 1995

§ 102(e) Date: Oct. 11, 1995

[87] PCT Pub. No.: WO94/15050

PCT Pub. Date: Jul. 7, 1994

[30] Foreign Application Priority Data

Dec. 22, 1992 [DE] Germany ............... 92 17 546.5 U
Apr. 20, 1993 [DE] Germany ............... 93 05 893.4 U

[51] Int. Cl.⁶ ........................................... B60R 25/02
[52] U.S. Cl. .................. 70/208; 70/451; 70/462; 70/448; 70/116; 292/39; 292/336.3
[58] Field of Search ............... 292/336.3, 9, 39; 70/715, 116, 208, 448, 450–452, 462

[56] References Cited

U.S. PATENT DOCUMENTS

| | | | |
|---|---|---|---|
| 4,063,763 | 12/1977 | Van Herpen | 292/39 |
| 4,616,864 | 10/1986 | Douglas | 292/39 X |
| 4,631,937 | 12/1986 | Debus et al. | 292/39 X |
| 4,754,624 | 7/1988 | Fleming et al. | 70/462 X |
| 4,848,811 | 7/1989 | Laufenburg et al. | 292/39 X |
| 4,930,325 | 6/1990 | Ramsauer | 292/39 X |
| 4,998,757 | 3/1991 | Ramsauer | 292/39 |
| 5,118,143 | 6/1992 | Gerard | 292/39 |
| 5,171,047 | 12/1992 | Korb et al. | 292/39 |
| 5,318,333 | 6/1994 | Dreifert | 292/336.3 |
| 5,419,167 | 5/1995 | Yamada et al. | 70/462 X |

FOREIGN PATENT DOCUMENTS

| | | | |
|---|---|---|---|
| 446566 | 9/1991 | European Pat. Off. | 292/336.3 |
| 589170 | 3/1994 | European Pat. Off. | 292/39 |
| 2653155 | 4/1991 | France | 292/336.3 |
| 2247714 | 3/1992 | United Kingdom | 292/336.3 |
| 2260362 | 4/1993 | United Kingdom | 292/39 |

*Primary Examiner*—Suzanne Dino
*Attorney, Agent, or Firm*—Evenson McKeown Edwards & Lenahan, PLLC

[57] ABSTRACT

A locking device is used for doors of cabinets or cupboards and, more particularly, for doors of modular cupboard systems. In order to create an operationally reliable, inexpensive locking device which is suitable for narrow counterstops and which permits an installation independently of the fixing side, as well as an inexpensive conversion when the fixing side is changed, the locking device is given a bipartite construction with a handle positioned in the vicinity of a door plate and a bolt mechanism operable by a tumbler. The device has a first door plate area receiving the handle and a second door plate area. A locking movement, initiated by the handle, is subject to a deflection, preferably of approximately 90°, in the direction of a counterstop and a closed or open position of at least one locking element in a cabinet or cupboard-side receptacle is obtained.

19 Claims, 4 Drawing Sheets

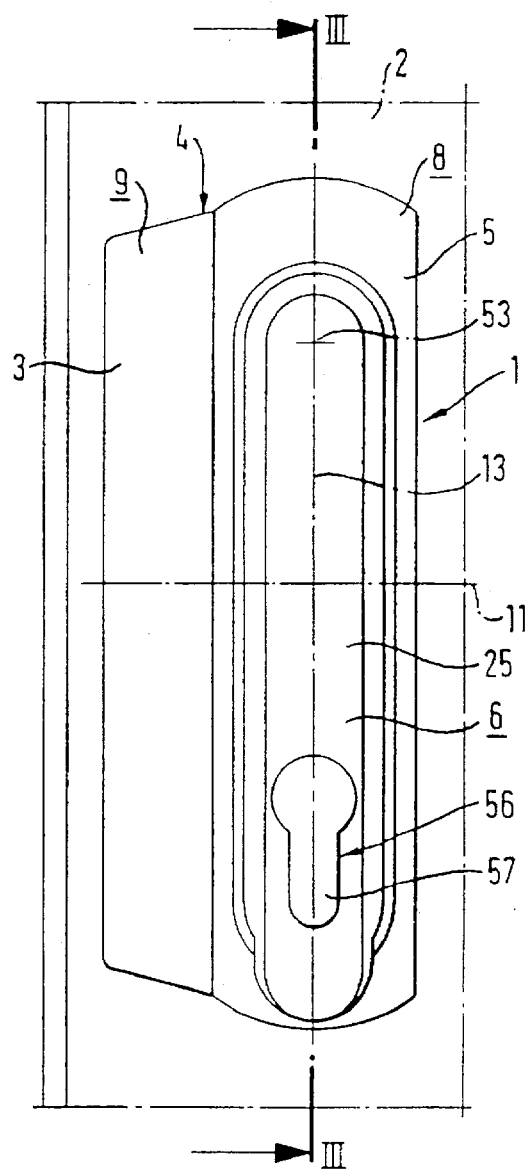
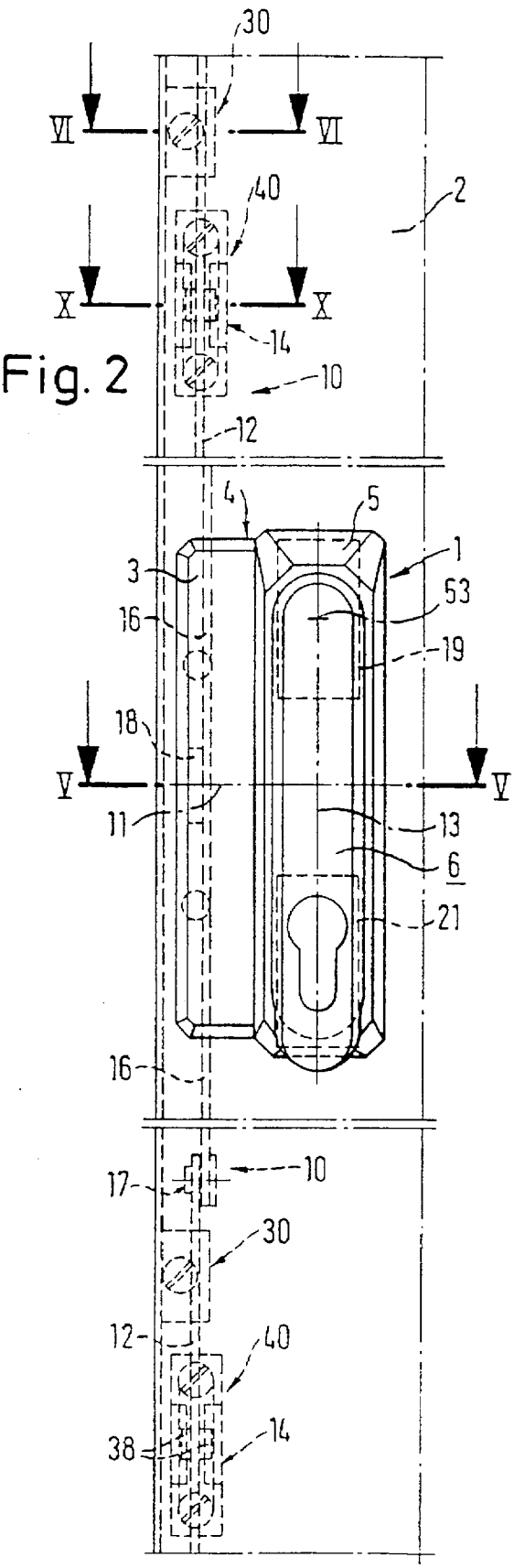

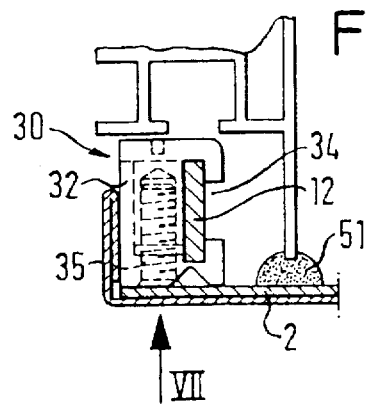
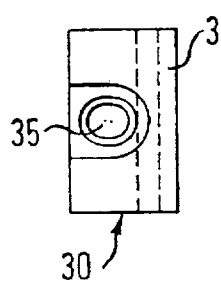
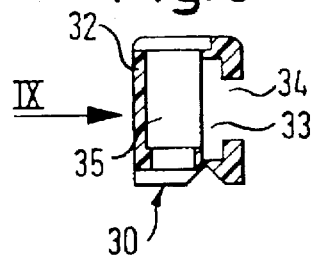
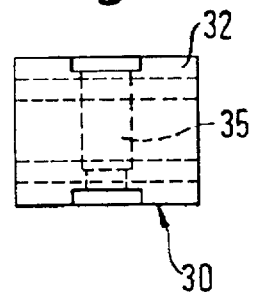
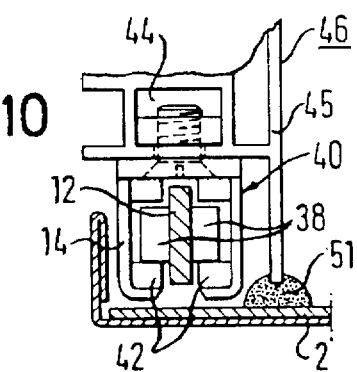
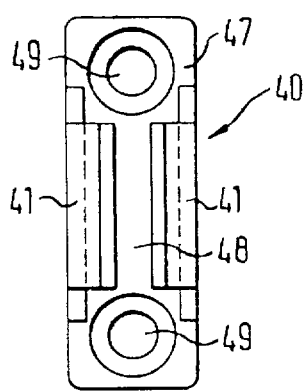
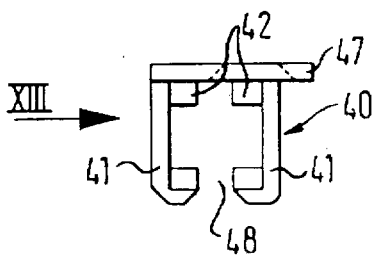
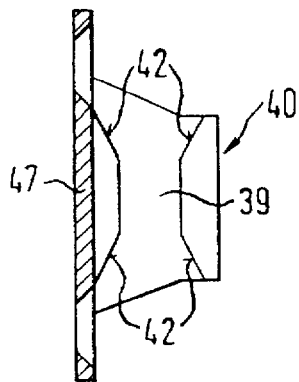

LOCKING DEVICE FOR CABINET OR CUPBOARD DOORS

BACKGROUND OF THE INVENTION

1. Field of the Invention

This invention relates to a locking device for cabinet or cupboard doors and, more particularly, to the doors of modular cupboard systems which are intended to house electronic equipment or units in the work places of electronic engineers or technicians.

In order to be able to manufacture cupboards or cabinets with a 19 inch construction and also in metric form, and in order to have a large, easily accessible and usable interior, it is recommended to use a very narrow counterstop, e.g. a narrow hollow frame or section, as a frame member. Side and rear walls, as well as doors, are fixed to the frame member.

It is known to secure removable side and/or rear walls from the exterior or interior and to provide a cupboard door with a locking device, e.g. in the form of a door lock, in order to prevent unauthorized access to the equipment housed therein. In addition, in most cases it is also necessary to provide, in the door area, a seal against the entry of dust and water. A HF shielding, which also presupposes a reliable door tumbler, is also needed.

For locking plates to be fitted as a counterstop at the cupboard side and having bolt receptacles for horizontally adjustable bolts, standard locking devices require correspondingly wide frame members. Such frame members can only be installed with difficulty in cupboard constructions with narrower frame sections.

The object of the invention is to provide an inexpensive, operationally reliable locking device having a design which still permits installation in narrow cupboard and cabinet frame profiles and independently of the door fixing side.

The invention is based on the idea of subdividing a locking device into two areas. A tumbler and a bolt mechanism are constructed and arranged so that a locking movement, initiated by a handle, leads to a deflection of approximately 90° in the direction of a counterstop. A closing or opening position of at least one locking element in a cupboard or cabinet-side receptacle is achieved.

According to the invention, a locking device with a handle located in the vicinity of a door plate and a bolt mechanism operable by a tumbler are constructed in a bipartite manner. The door plate located on the outer face of a door leaf is also given a bipartite construction.

The bipartite door plate has a first plate area with a base plate. A rocking lever, a clamp handle, a key or the like can be arranged on the base plate as a handle. As a second door plate area, an attached plate which, in the direction towards the door edge, engages the longitudinal side of the base plate can be arranged. Inside of the attached plate as the second door plate area, and on the outer face of the door leaf, is provided, in vertically adjustable manner, a sliding plate as the tumbler. The sliding plate is operable by the handle and is in operative connection with a bolt mechanism. The bolt mechanism has a locking rod which is preferably parallel and perpendicular to the sliding plate. The bolt mechanism also has at least one locking element and an appropriate rod guide for the locking rod, as well as a dog as a connection between the sliding plate and the locking rod. As a result of a closing movement of the handle, adjustment in a vertical construction, by a toothed wheel acting as the nut of a lock or a hinge-pinion and meshing teeth of the thrust plate, is transferred to the dog of the locking rod in the form of a vertical movement. When the door is closed, the at least one locking element comes into positive and/or non-positive engagement with the at least one cabinet or cupboard-side receptacle.

The bipartite construction of the door plate is, in particular, made possible by a space-saving, almost positive reception of the toothed wheel or the hinge-pinion and the sliding plate in a relatively flat intermediate space. This space is formed by the base plate and the attached plate as the first and second door plate areas and a door outside and by the approximately 90° deflection between the sliding plate and the locking rod. As a result, it is possible to use a narrow counterstop, e.g. a narrow profile frame, in cupboards and cabinets. Consequently, there is a larger usable internal space for the arrangement of electronic and electrical units. Further advantages are the possible arrangement of a cable support and guide on the inside of the narrow profile frame, as well as an improved air circulation and cooling of the equipment and units in the cupboards and cabinets.

Particular advantages for an inexpensive installation and storage with respect to the constructional parts of the locking device are obtained due to the split, positively engaging construction of the base plate and the attached plate as the door plate areas and the parts covered by the latter. This construction permits a random fitting of the locking device as a function of a right or left-side door fixing without additional parts and adaptation work. For this purpose, the sliding plate is provided with upper and lower teeth, which allow a right and left-side arrangement of the sliding plate, based on the toothed wheel or hinge-pinion operable with the handle, as the result of a simple reversal of the sliding plate.

According to a particularly advantageous further development of the invention, a bipartite door plate located on an outer face of a door leaf has a first door plate area with a base plate on which is located, as the handle, a rocking lever which can be provided with a cylinder lock. In order to permit a particularly time and cost-effective fitting of the device, in the vicinity of the rocking lever axis and in the vicinity of the cylinder lock, the base plate is provided with retaining blocks engaging in recesses of the door leaf. An upper retaining block for the hinge-pinion and a lower retaining block, e.g. for a cylinder lock, are constructed in a complementary manner to the preferred, rectangular recesses of the door leaf, particularly of a hat shape or section. The hat section is positioned on the inside of the door leaf.

2. Description of Related Art

EP-261 260 B1 already discloses a locking device for fitting in sheet metal cabinet doors. The locking device is fixed with the aid of shoulders of the base plate of the door plate fittable into openings of the door leaf or engaging behind the openings and having a cap or retaining part. The cap or retaining part is, in each case, screwed down from the inside of the door. In the vicinity of a door plate, this locking device has a base plate with a lockable rocking lever. The locking device is constituted by a cylinder lock engaging in the lower shoulder of the base plate. In the vicinity of the upper shoulder is provided a hinge-pinion operable with the rocking lever. The hinge pin is in operative connection with at least one locking rod. The construction of the locking device permits fitting in the tilting space of a cupboard door. This locking device is also suitable for doors fixed to the right and left.

However, a subsequent modification of the fastening requires the disassembly of at least one locking rod and the lock. A fitting in cabinets or cupboards with particularly narrow frame profiles is only possible with difficulty. In addition, having the locking rod guided in the vicinity of the base plate can create an unfavorable effect on the design, particularly in the vicinity of the cylinder lock.

SUMMARY OF THE INVENTION

The locking device according to the invention has a particularly simple construction and is used in a preferred manner for cabinets and cupboards with narrow counter-stops. The same components permit fitting on right and left-fixed doors. A subsequent modification to the fixing side involves particularly little effort and expenditure for disassembly and refitting of the locking device.

For fastening purposes, holes are provided in each retaining block and are aligned with openings in the hat section. With fastening elements, particularly screws, which are introduced from the hat section, a reliable and stable fastening of the base plate with the rocking lever and locking mechanism is ensured.

In order to ensure a seal, particularly a dust and splash-proof seal, for the cabinet or cupboard in the vicinity of the locking device, it is appropriate to provide, at least between the hat section and the retaining blocks or base plate, a sealing strip. In addition, there can also be a seal in the vicinity of the fastening elements or the openings or holes.

Appropriately, the base plate and the attached plate engaging on one longitudinal side of the base plate in the direction of the door edge have a symmetrical construction. This construction, in conjunction with the symmetrical sliding plate, permits a random fitting of the locking device as a function of a right or left door fixture without using additional parts and without involving adaptation work.

Appropriately, the first door plate area, i.e. the base plate, is constructed symmetrically to its longitudinal axis. The attached plate, as the second door plate area, is constructed symmetrically to its transverse axis.

In the case of a subsequent modification to the fixing side, due to this symmetrical construction, the base plate is dismantled as a unit and is then reinstalled following the reversal of the door. For this purpose, the fastening screws engaging in the retaining blocks of the basic profile are released from the hat section. The complete door, with door-side hinge parts and with the attached plate, is then turned about the upper or lower door edge by 180°. The complete base plate, with the retaining blocks, is inserted and fixed in the recesses.

If, in accordance with a particularly preferred construction, the recesses in the hat section of the door and also the complementary-constructed retaining blocks of the base plate have identical constructions, then the fitting associated with self-centering can be performed particularly easily and rapidly.

It is advantageous that, for an interchangeable arrangement of this preferred locking device, only two recesses have to be present in the door. The base plate can be fitted and oriented in the arrangement without additional adaptation elements being required.

It is possible to construct the retaining blocks in a manner complementary to the hat section. In addition, retaining blocks having smaller dimensions can be provided with caps. They may be fixed to the hat section, so that the retaining blocks are virtually fitted in and can then be screwed down. The caps can also be applied from the inside of the door in the form of a cover to the retaining blocks.

A dog, which appropriately extends over virtually the entire length of the attached plate and can be connected via connecting areas to the locking rod, engages with a nose in a recess of the sliding plate. Vertical adjustment movements of the nose are transferred to the dog and the locking rod.

The locking rod which, like the parallel dog, is at right angles to the sliding plate and to the door surface, extends over and beyond the door plate area and is held in stable, adjustable manner in at least one rod guide. A rod guide can be constructed as a guidance block with a recess adapted to the cross-section of the locking rod. Preferably, the locking rod has a rectangular cross-section.

In order to permit the right and left-side fitting of a locking device, it is appropriate to fix the guidance blocks in a detachable, displaceable manner on the inside of the door.

At least one locking element can be formed by two bolt elements positioned horizontally and on either side of the locking rod or, more preferably, can be formed by two rolls and the locking rod in this area. In order to implement an operationally reliable locking position, the locking element is retained in positive and/or non-positive manner by a complementary-constructed cabinet or cupboard-side receptacle. In an advantageous locking device configuration, there are upper and lower locking elements and corresponding receptacles, which can be fixed in detachable, displaceable manner in a T-slot of a hollow section. Such a construction, as a result of the distance between the locking elements, increases the stability of the door lock. In an appropriate construction, a cabinet or cupboard-side receptacle comprises a double hook-shaped component, which has a spacing opening directed towards the locking rod and vertically positioned wedge surfaces for the directed insertion of the locking element. Appropriately, the wedge surfaces are constructed in the upper and lower areas so that two bolt elements, arranged on either side of the locking rod and in particular rolls, can be moved upwards and downwards towards the open position.

In order to achieve very low-noise locking and unlocking operations, it is appropriate to make at least certain areas of the locking device and the guide rod from plastic material.

According to an advantageous development, the door plate and, more particularly, the base plate, as well as the handle, preferably a rocking lever, are given an ergonomic design. For example, the rocking lever can be virtually positively received by the outer door plate area.

It is appropriate to provide a locking mechanism such as a lock cylinder in the locking device. The locking mechanism can be located in the rocking lever or in a trough of the first, outer door plate area receiving the rocking lever. According to the first variant, the door and the rocking lever are secured. However, according to the second variant, a rocking lever, extending up to the lock cylinder when the door is closed, can be moved out of its positive and optionally engageable receptacle.

BRIEF DESCRIPTION OF THE DRAWINGS

The invention is described in greater detail hereinafter relative to the drawings.

FIG. 1 is a view of a first variant of a locking device according to the invention in the vicinity of a door plate located on a door outside.

FIG. 2 is a diagrammatic overall view of a further development of a locking device according to the invention with an alternative door plate design.

FIG. 6 is a cross-section in the vicinity of a rod guide along line VI—VI in FIG. 2

FIG. 7 is a view of a rod guide according to arrow VII in FIG. 6.

FIG. 8 is a cross-section through a guide block without the locking rod.

FIG. 9 is a side view of a guide block in the direction of arrow IX in FIG. 8.

FIG. 10 is a cross-section of a locking device according to the invention in the vicinity of a cabinet or cupboard-side receptacle along line X—X in FIG. 2.

FIG. 11 is a plan view of a receptacle without the locking element.

FIG. 12 is a view of a cabinet or cupboard-side receptacle.

FIG. 13 is a side view in the direction of arrow XIII in FIG. 11.

DESCRIPTION OF THE PREFERRED EMBODIMENTS

Figure 3:
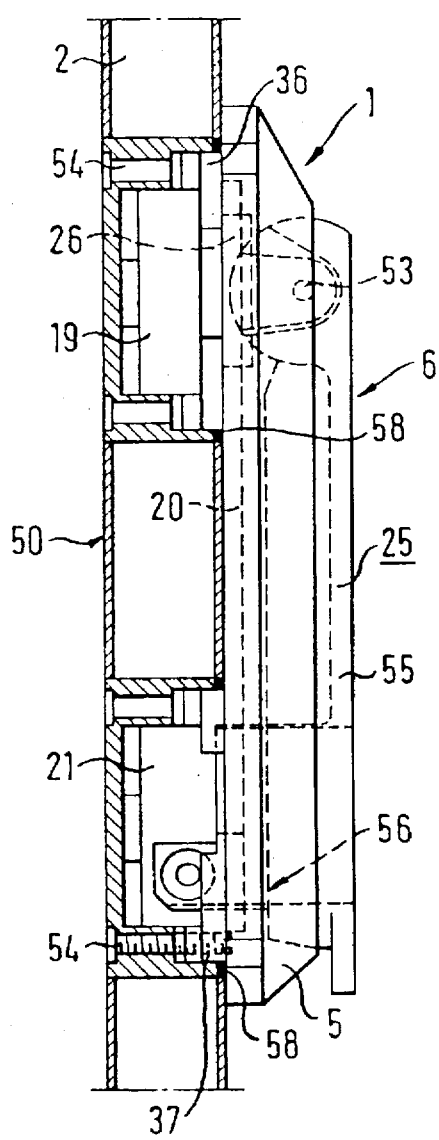
FIG. 3 is a vertical section along line III—III of FIG. 1.

FIG. 1 is a view of a door 2 with a locking device 1 according to the invention. A door plate 4 is fitted to the outer surface of the door 2. The door plate 4 is longitudinally divided into two portions and has, as a first door plate area 8, a base plate 5 and, as a second door plate area 9, an attached plate 3. The handle 6 is constituted by a rocking lever 25 in the vicinity of the base plate 5. The rocking lever, in the represented locked position, can be secured by a key-operated locking mechanism 56, e.g. a cylinder lock 57. The left-fixed door 2 can, following the disassembly of the base plate 5, pivoting of the door 2 with the remaining attached plate 3 and then reinstallation of the base plate along the attached plate 3, be transformed without any particular effort to form a right-fixed door. To this end, the attached plate 3 is constructed symmetrically relative to its horizontal axis 11 and the base plate 5 symmetrically relative to its longitudinal axis 13.

In a preferred embodiment of the locking device according to the invention, and as shown in broken line form in FIG. 2, retaining blocks 19, 21 engaging in recesses 36, 37 of a door-side hat section 50 (cf. FIGS. 3 and 5) are constructed on the base plate 5 in the vicinity of the rocking lever axis 53 and in the vicinity of the cylinder lock 57.

If it is necessary to modify the locking device for modifying the door fixing side, it is merely necessary to disassemble the complete base plate 5. After reversing the door 2, by means of an upper or lower edge, the attached plate 3 is located to the right of the reinserted base plate 5. Advantageously, the recesses 36, 37 and the retaining blocks 19, 21 have identical constructions so that the base plate can be fixed in a random manner with the retaining blocks.

FIG. 2 is a highly diagrammatical overall view of a locking device according to the invention in partial section. This view shows the arrangement and construction of a bolt mechanism 10 on an inside of a door 2. In the vicinity of the attached plate 3 of the door plate 4, the bolt mechanism 10 has a rod-like dog 16, which is connected by means of a nose 18 to a sliding plate 20 (FIGS. 3 to 5) and is adjusted vertically with the sliding plate 20. A locking rod 12 runs above and below the door plate 4 parallel to the dog 16. In connecting areas, of which only the lower connecting area 17 is shown, the locking rod 12 engages flat on the dog 16. Like the dog 16, the locking rod 12 is positioned perpendicular to the inside of the door 2 and to the attached plate 3.

In another embodiment, the dog 16 and/or the locking rod 12 can also be parallel to the inner face of the door leaf. It is important to have a right-angled arrangement of the sliding plate 20 and dog 16 with locking rod 12.

For stable, controlled mounting, the locking rod 12 is received in a rod guide 30 fixed to the inside of the door above and below the door plate 4. The rod guide will be described in conjunction with FIGS. 6 to 9. A closed position of the locking device is obtained if at least one locking element 14, which has two rolls 38 mounted on either side of the locking rod 12, engages with at least one covered or cabinet-side receptacle 40. The construction of a receptacle 40 and the cooperation with the locking element 14 is apparent from FIGS. 10 to 13.

Figure 5:
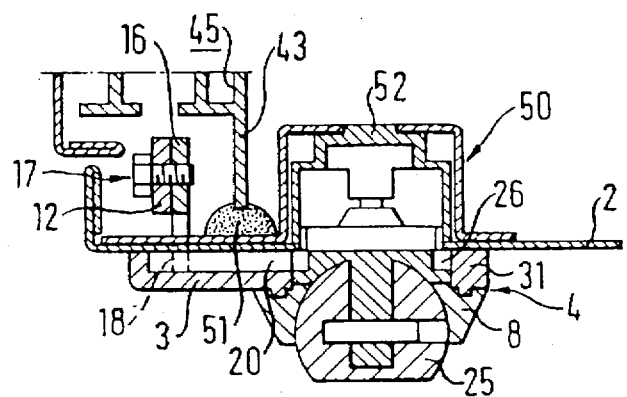
FIG. 5 is a cross-section along line V—V of FIG. 2.

It can be seen from FIGS. 2 and 5 that, as a result of positioning the locking rod 12 perpendicular to the door inside, there is an operationally reliable tumbler and locking in at least one particularly narrow, covered-side receptacle 40, so that it is also possible to use relatively narrow, vertical spaces or profile frames for cabinets and cupboards.

The locking device 1 is provided with two locking elements 14 and cupboard-side receptacles 40, which have a corresponding spacing from one another and ensure a stable door locking.

Figure 4:
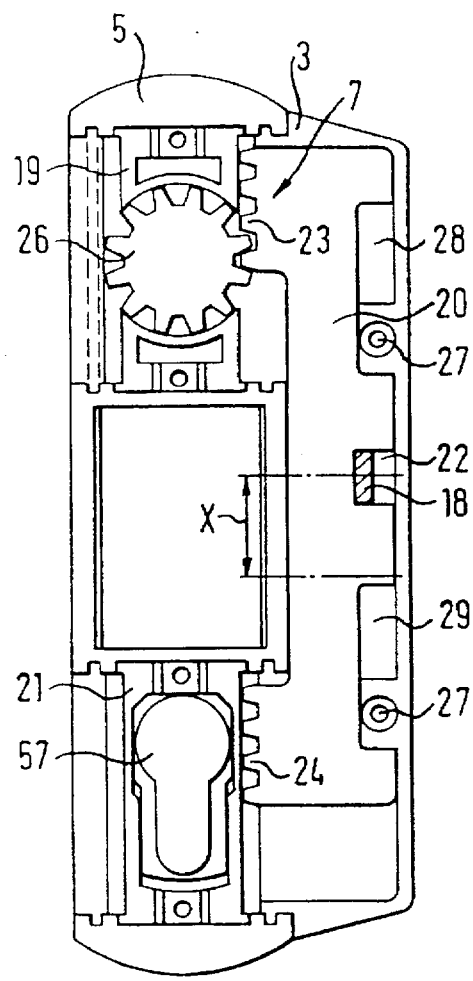
FIG. 4 is an inside view of a door plate according to FIG. 1.

FIGS. 3 to 5 show the construction and arrangement of the bipartite door plate 4, a sliding plate 20 inserted as a tumbler 7, as well as the cooperation between the rocking lever 25, hinge-pinion 26 and sliding plate 20 in the vicinity of the bipartite door plate and on the outer face of the door leaf. The same reference numerals are used for identical features. A closing or opening movement is initiated by the rocking lever 25 mounted as the handle 6 on the base plate 5 of the first door plate area 8 and which has, in a gripping area 55, a cylinder lock 57 as the locking mechanism 56 cooperating with the base plate 5.

FIG. 3 shows the virtually positive reception of the rocking lever 25 on the base plate 5 and the fixing of the locking device 1 in a hat section 50. The hat section 50 is located on the inside of the door 2 and serves to reinforce the door 2 in this area.

In a particularly preferred construction, the base plate 5 has, in the vicinity of the rocking lever axis 53, an upper retaining block 19 and in the vicinity of the locking mechanism 56 a lower retaining block 21, which can be inserted and detachably fixed in an upper or lower recess 36, 37 of the hat section 50 accompanied by the self-centering of the locking device 1.

For fixing purposes, fastening elements are provided. The fastening elements include screws 54, which are screwed into holes of the hat section 50 and the retaining blocks 19, 21. For sealing the cabinet or cupboard between the retaining blocks 19, 21 or the base plate 5 and the hat section 50, a seal 58 is provided, which at least ensures a dust and splash-proof seal in the vicinity of the locking device.

Preferably, the retaining blocks 19, 21 and the base plate 5 with the hinge-pinion 26, rocking lever axis 53 or cylinder lock 57 form a unit. It can be advantageous to connect the retaining blocks 19, 21 detachably to the base plate 5 in order to use locking mechanisms and/or tumblers and permit an easy replacement of components.

A closing or opening of the locking device 1 takes place if the rocking lever 25 is swung up and the hinge-pinion 26, serving as the nut of a lock and located in the vicinity of the pivot pin 53, is correspondingly adjusted. The clockwise or counterclockwise adjusting movement is transformed into a vertical movement by upper, meshing teeth 23 of the sliding plate 20 and transferred by the dog 16 to the locking rod 12 and the at least one locking element 14 located on the locking rod 12.

An inner view according to FIG. 4 and a cross-section according to FIG. 5 show the space-saving, positive reception of the sliding plate 20 in an intermediate space formed by the attached plate 3 and the door 2. The connection between the sliding plate 20 and the bolt mechanism 10 with the locking rod 12 takes place by means of a nose 18 formed on the dog 16 and which engages or is detachably fixed in a lateral recess 22 of the sliding plate 20. A vertical adjustment of the sliding plate 20, e.g. a lifting movement brought about by the rocking lever 25 by means of the hinge-pinion 26, is designated X in FIG. 4. For the adjusting movement of the nose 18 of the dog 16, a correspondingly dimensioned recess 22 is provided in the door 2.

The sliding plate 20, in the same way as the attached plate 3, the base plate with retaining blocks 19, 21 and the door 2 with recesses 36, 37 is constructed for right and left-side door fixing. The sliding plate 20 has, in addition to upper teeth 23, lower teeth 24. Following a reversal or turning round of the door 2, in which the attached plate 3, the sliding plate 20 and optionally also the dog 18 remain on the door 2, the lower teeth designated 24 in FIG. 4 come to the top and into the engagement area of the hinge-pinion 26. It is advantageous that only the base plate 5, with retaining blocks 19, 21 and with fitting parts, has to be turned by 180°. Turning can be performed simply and rapidly due to the identical constructions of the retaining blocks 19, 21 and the identical constructions of the recesses 36, 37.

The attached plate 3 is fixed with fastening elements 27 such as screws to the door 2. Vertical rectangular recesses 28, 29 are provided on the sliding plate 20 for unhindered closing movement.

The cross-section according to FIG. 5 illustrates the cooperation between the rocking lever 25 as the handle, the hinge-pinion 26 or a toothed wheel and the sliding plate 20 with the bolt mechanism 10 and, in particular, with the nose 18 of the dog 16 and the locking rod 12. It is important for the construction of the locking device according to the invention to deflect the locking or closing movement by 90°. This is made possible by the right-angled arrangement of the locking rod 12 with dog 16 and nose 18 compared with the sliding plate 20. FIG. 5 shows a screw connection in a connecting area 17 between the cross-sectionally rectangular locking rod 12 and the flat-engaging dog 16. For better understanding, FIG. 5 does not show a receptacle 40 fixed to a vertical hollow section 45 for receiving an also not shown locking element 14 (FIGS. 10 to 13) in the closed position of the door 2 shown in FIG. 5. In this closed position, a seal, such as an elastomeric dust and splash-proof seal 51 located on an outer leg 43 of the hollow section 45, engages inside of the door 2. FIG. 5 also particularly clearly illustrates the bipartite construction of the door plate 4 and the possible interchangeable arrangement of the attached plate 3 as the second door plate area to the right or left of the base plate 5 as the first door plate area. In a particularly simple manner, from a constructional standpoint, clearance-like openings on the unused longitudinal side of the base plate 5 can be covered or sealed with filling elements 31 or a facing.

FIG. 6 shows a guide block 32 of a rod guide 30 in cross-section. The guide block 32 is fixed by a welded bolt 35 inside of the door 2 and has a virtually U-shaped construction. The locking rod 12 guided in a vertical recess 33 can be inserted by an insertion opening 34 and is guided in the manner of a film hinge in plastic guide blocks 32. It is appropriate for a locking rod 12 to have at least two spaced guide blocks 32 located on the inner door in order to ensure a reliable, controlled locking movement of the locking rod 12.

The actual locking takes place with the aid of the covered-side receptacle 40 shown in FIGS. 10 to 13 and a locking element 14. The locking element can comprise two rolls arranged horizontally and on either side of the locking rod 12. The rolls 38 are arranged with a corresponding fastening, are optionally rotatable on the locking rod 12 and are made from plastic material. The cupboard-side receptacle 40 comprises two hook-like elements 41, which are arranged homologously to one another in the form of a double hook on a fastening flange 47. A detachable and displaceable fastening advantageously takes place by fastening elements 49, such as screws, in a recess, e.g. a T-slot 44 of a vertical hollow section 45 of a frame 46. During the closing or locking process the locking rod 12 passes by a slot-like spacing opening 48 of the cupboard-side receptacle 40 into the vicinity of the double hook 41. In order to ensure a directed insertion of the locking element 14, upper and lower, vertically directed wedge surfaces 42 are formed on the double hook by means of which the rolls 38 of the locking element 15 pass into a locking position in a central area 39. An insertion of the locking elements 14 into a receptacle 40 can be brought about both from above and from below. The construction of the double hooks 41 as cupboard-side receptacles 40 also makes possible a random left or right-side fixing. The guide blocks 32 of the rod guide 30 can also be used for left or right-side fixing.

Figure 14:
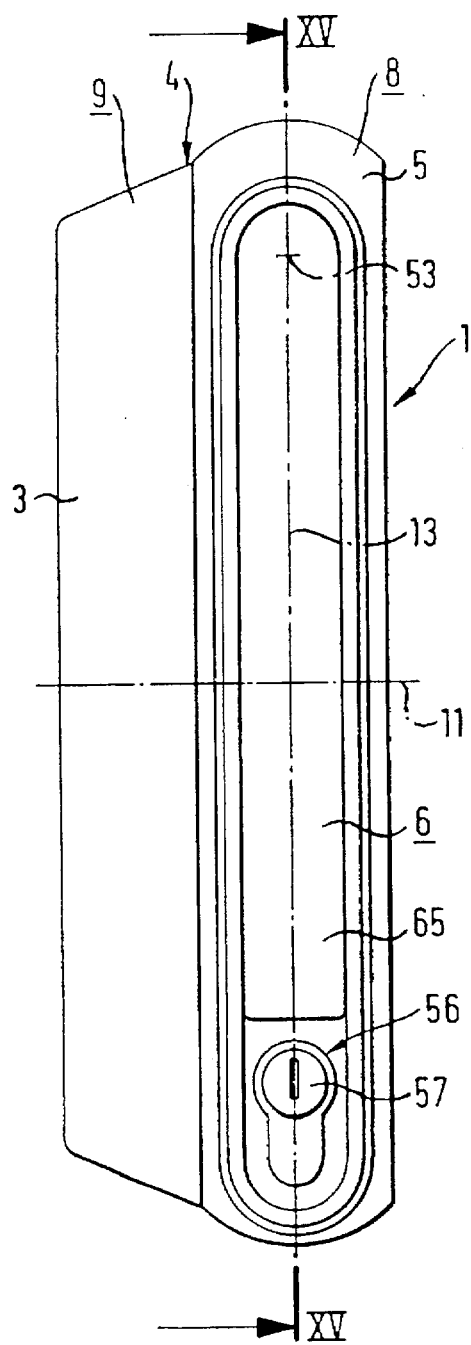
FIG. 14 is a view of another variant of a locking device according to the invention with a bipartite door plate.
Figure 15:
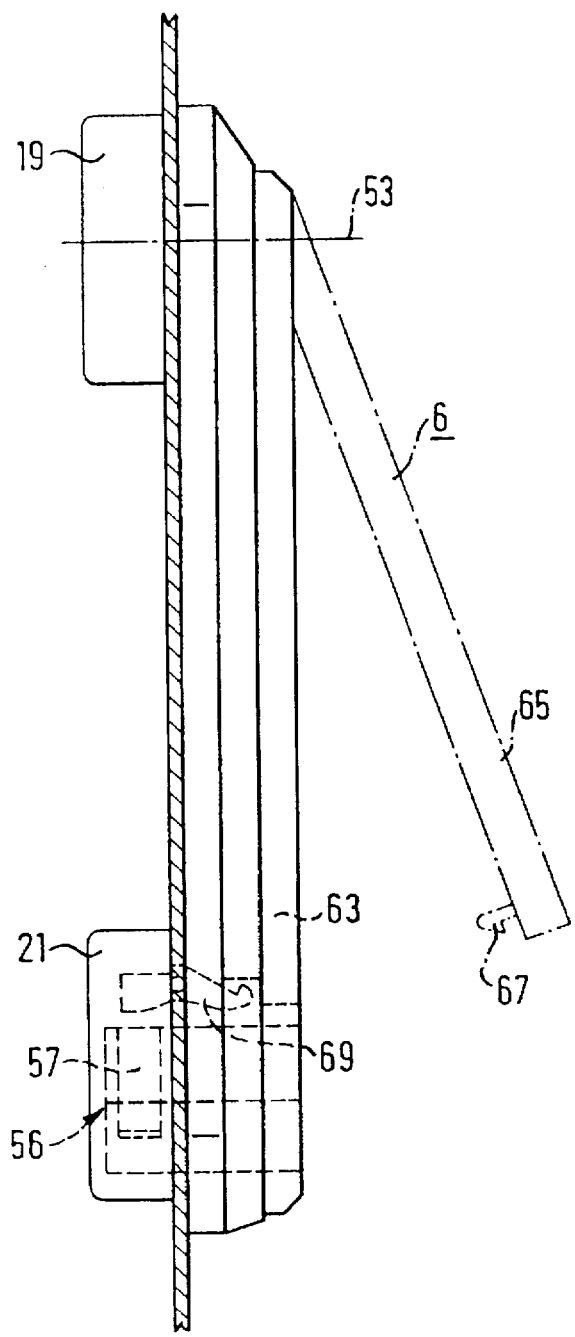
FIG. 15 is a vertical section along line XV—XV in FIG. 14.

FIG. 14 is a view of another variant of a locking device 1 according to the invention. Identical features are indicated by identical reference numerals. In this variant, on a first door plate area 8 with a base plate 5, a shortened rocking lever 65 is provided as the handle 6. The rocking lever 65 terminates above a locking mechanism 56, formed by a cylinder lock 57, which is received in a lower retaining block 21. The rocking lever 65 is received, in the locked position, in a trough-shaped recess 63 of the base plate 5 and, for the operation of a hinge-pinion located in the vicinity of the pivot in 53 (cf. FIGS. 3 to 5 ), can be swung up (cf. FIG. 15). Appropriately, there is an engageable locking position of the shortened rocking lever 65. The stop location is reached by a detent 67 in the lower area of the rocking lever 65, which cooperates with a lever-like arm bracket 69 in the vicinity of the lower retaining block 21.

We claim:

1. A locking device for doors of cabinets or cupboards comprising:

a bolt mechanism including a locking rod, at least one locking element located on said locking rod, at least one cabinet or cupboard side receptacle in which the at least one locking element is held in the closed position, and a handle and a tumbler located in the vicinity of a door plate for operating said bolt mechanism, the door plate being bipartite and having a base plate as a first door plate area receiving the handle and an attached plate as a second door plate area wherein the base plate is constructed symmetrically with respect to a longitudinal axis and can be selectively positioned along the attached plate and wherein inside of the attached plate and outside of a door leaf a vertically adjustable sliding plate as the tumbler is mounted, the locking rod having a rectangular cross-section with a shorter side and a longer side, said longer side extending perpendicular to the sliding plate, and being operatively connected to and operable by the sliding plate.

2. A locking device according to claim 1, wherein the sliding plate and the first and second door plate areas are constructed for left and right-side door fixing and further comprising upper and lower sets of teeth provided on the sliding plate and a toothed hinge-pinion of the handle with which one of said sets of teeth mesh.

3. A locking device according to claim 2, wherein the base plate has upper and lower retaining blocks fixed in recesses of the door leaf.

4. A locking device according to claim 3, wherein said handle forms a rocking lever pivotable about a rocking lever axis, the upper retaining block of the base plate is located in the vicinity of the rocking lever axis, the upper retaining block is constructed identically to the lower retaining block, and further comprising a cylinder lock in the vicinity of the lower retaining block provided as a locking mechanism.

5. A locking device according to claim 4, wherein the upper and lower retaining blocks are rectangular in section, are held in recesses of a hat section of the door leaf, and are constructed complimentary to the recesses, and further comprising fastening elements for fixing the retaining blocks which can be introduced from the hat section.

6. A locking device according to claim 5, wherein the retaining blocks are provided with caps and are fixable in the recesses and the caps are located in the vicinity of the door leaf for sealing the upper and lower retaining blocks.

7. A locking device according to claim 6, and further comprising seals so that the retaining blocks can be sealed with the caps and with the seals.

8. A locking device according to claim 4, wherein the sliding plate is operable by said rocking lever and further comprising a dog connected to the locking rod in the vicinity of the door plate.

9. A locking device according to claim 8, wherein the hinge-pinion is connected by said one of said sets of teeth to the dog and the locking rod and that the hinge-pinion and the sliding plate are received by an attached plate secured to the base plate.

10. A locking device according to claim 9, wherein the dog is adjustable inside of the door leaf and in the vicinity of the attached plate, the dog is connected to the locking rod, and the dog has a nose guided in a recess of the sliding plate.

11. A locking device according to claim 9, and further comprising at least one rod guide which receives the locking rod and has a guide block, fixed inside of the door leaf, and provided with a vertical recess complimentary to a cross-section of the locking rod.

12. A locking device according to claim 11, wherein the guide block is approximately U-shaped, has an insertion opening for the locking rod, and is fixed in a detachable, displaceable manner to the door leaf.

13. A locking device according to claim 3, and further comprising rolls arranged on both sides of the locking rod and, together with said locking rod, forming the at least one locking element, the at least one side receptacle having vertical wedge surfaces in which the locking element engages in a locked position.

14. A locking device according to claim 13, wherein the at least one side receptacle is fixed in a T-slot of a vertical hollow section of a frame and is constructed with double hooks with an opening, directed towards the door leaf, for the locking rod.

15. A locking device according to claim 3, and further comprising fastening elements for fixing the sliding plate to the attached plate and vertical recesses formed in the vicinity of said fastening elements.

16. A locking device according to claim 4, wherein the rocking lever is provided on the base plate and, in a locked position, is positively received by said base plate.

17. A locking device according to claim 16, and further comprising a locking mechanism for locking the rocking lever and a cylinder lock positioned in the lower retaining block.

18. A locking device according to claim 16, and further comprising an arm bracket in a trough-shaped recess of the base plate, wherein said rocking lever is a shortened rocking lever having a detent which is fixed in position by said detent and said arm bracket.

19. A locking device according to claim 18, wherein the arm bracket forms a lever and is positioned in the vicinity of the lower retaining block.

\* \* \* \* \*